(12) United States Patent
McMullen

(10) Patent No.: US 9,203,279 B2
(45) Date of Patent: Dec. 1, 2015

(54) ELECTRIC MACHINE WITH INNER MAGNET HUB

(75) Inventor: Patrick T. McMullen, Villa Park, CA (US)

(73) Assignee: Vycon, Inc., Cerritos, CA (US)

( * ) Notice: Subject to any disclaimer, the term of this patent is extended or adjusted under 35 U.S.C. 154(b) by 872 days.

(21) Appl. No.: 13/197,219

(22) Filed: Aug. 3, 2011

(65) Prior Publication Data

US 2013/0033136 A1 Feb. 7, 2013

(51) Int. Cl.
| | |
|---|---|
| H02K 7/02 | (2006.01) |
| H02K 21/14 | (2006.01) |
| H02K 21/22 | (2006.01) |
| H02K 7/09 | (2006.01) |

(52) U.S. Cl.
CPC .................. *H02K 7/025* (2013.01); *H02K 7/09* (2013.01); *H02K 21/14* (2013.01); *H02K 21/22* (2013.01); *Y02E 60/16* (2013.01)

(58) Field of Classification Search
USPC ...................................... 310/74, 90.5, 156.12
See application file for complete search history.

(56) References Cited

U.S. PATENT DOCUMENTS

| | | | | |
|---|---|---|---|---|
| 3,685,127 | A | * | 8/1972 | Potter .............................. 29/530 |
| 5,384,792 | A | | 1/1995 | Hirachi |
| 5,703,423 | A | * | 12/1997 | Fukao et al. .................. 310/90.5 |
| 5,880,544 | A | * | 3/1999 | Ikeda et al. ....................... 310/74 |
| 5,966,996 | A | * | 10/1999 | Hamaekers ................... 74/574.4 |
| 5,994,794 | A | | 11/1999 | Wehrlen |
| 6,236,127 | B1 | * | 5/2001 | Bornemann ..................... 310/74 |
| 6,262,505 | B1 | * | 7/2001 | Hockney et al. ............. 310/90.5 |
| 6,304,006 | B1 | | 10/2001 | Jungreis |
| 6,388,347 | B1 | * | 5/2002 | Blake et al. ...................... 310/74 |
| 6,486,627 | B1 | | 11/2002 | Gabrys |
| 6,566,775 | B1 | * | 5/2003 | Fradella ....................... 310/90.5 |
| 6,657,320 | B1 | | 12/2003 | Andrews et al. |
| 6,750,588 | B1 | | 6/2004 | Gabrys |
| 6,798,092 | B1 | * | 9/2004 | Gabrys et al. ................... 310/45 |
| 7,633,172 | B2 | | 12/2009 | Kalev et al. |
| 7,855,465 | B2 | | 12/2010 | Kalev et al. |

(Continued)

OTHER PUBLICATIONS

Octavio Solis et al., "Common Monitoring and/or Control of a Flywheel and Battery-Based Power Supply System" U.S. Appl. No. 13/178,195, filed Jul. 7, 2011.

(Continued)

*Primary Examiner* — Naishadh Desai
(74) *Attorney, Agent, or Firm* — Fish & Richardson P.C.

(57) ABSTRACT

An electric machine includes a generally annular outer rotor supported to rotate about a rotational axis. The outer rotor defines an internal cavity therein and has a plurality of permanent magnets in the internal cavity generating a first magnetic field. An inner rotor is in the internal cavity and is supported to rotate about the rotational axis. The inner rotor has a plurality of permanent magnets about its perimeter that generate a second magnetic field. A generally annular stator is in the internal cavity between the outer rotor and the inner rotor. The stator has a stator winding supported by a non-magnetically conductive stator core. The stator winding is arranged to generate a field that interacts with the first and second magnetic fields. One of the outer rotor or the inner rotor is mechanically coupled to drive a load. The other of the outer rotor or the inner rotor is not mechanically coupled to drive the load.

25 Claims, 3 Drawing Sheets

(56) References Cited

U.S. PATENT DOCUMENTS

| 8,242,649 | B2* | 8/2012 | Fradella | 310/74 |
|---|---|---|---|---|
| 2004/0207266 | A1 | 10/2004 | Abel et al. | |
| 2004/0232800 | A1* | 11/2004 | Seguchi et al. | 310/266 |
| 2010/0019590 | A1* | 1/2010 | Guedes-Pinto et al. | 310/53 |
| 2011/0057456 | A1* | 3/2011 | Atallah et al. | 290/1 C |

OTHER PUBLICATIONS

Frank DeLattre et al., "Flywheel and Battery-Based Power Supply System" U.S. Appl. No. 13/196,327, filed Aug. 2, 2011.

Vycon, "Flywheel Technology: How It Works", http://vyconenergy.com/pages/flywheeltech.html, Copyright 2008, Aug. 3, 2011.

* cited by examiner

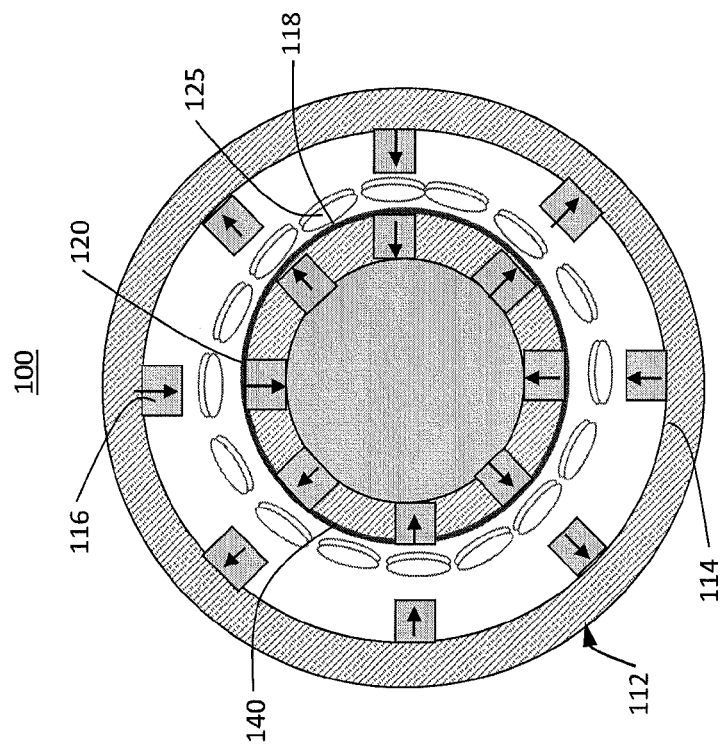
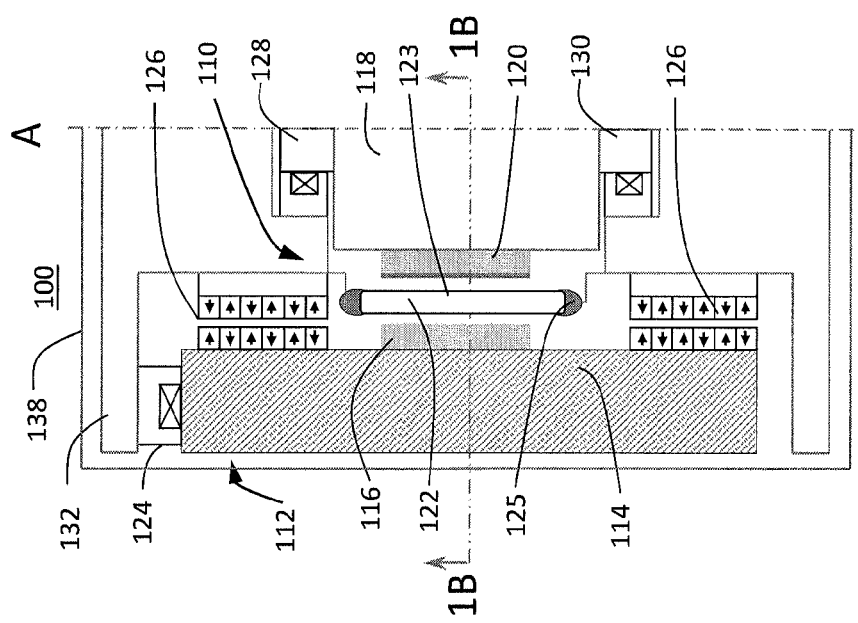
FIG. 1B
FIG. 1A

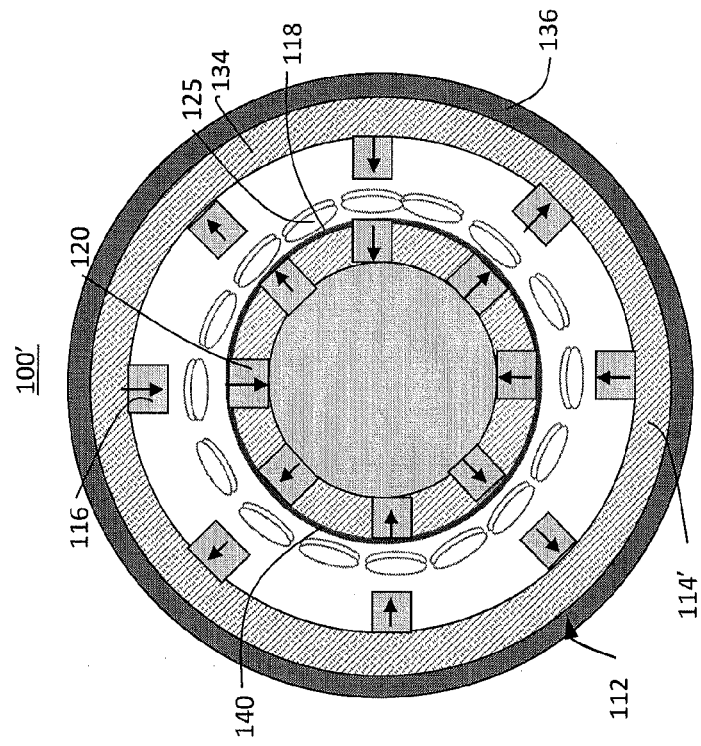
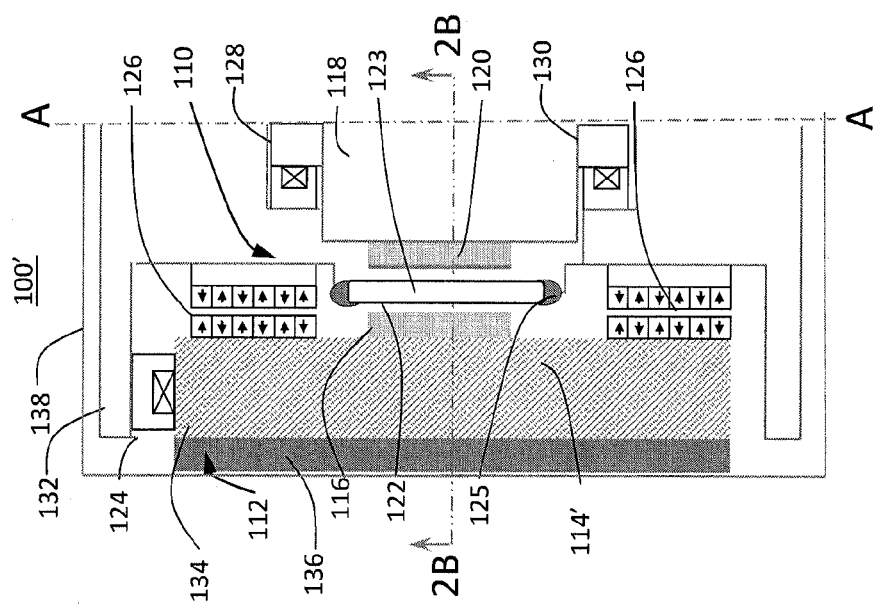
FIG. 2A
FIG. 2B

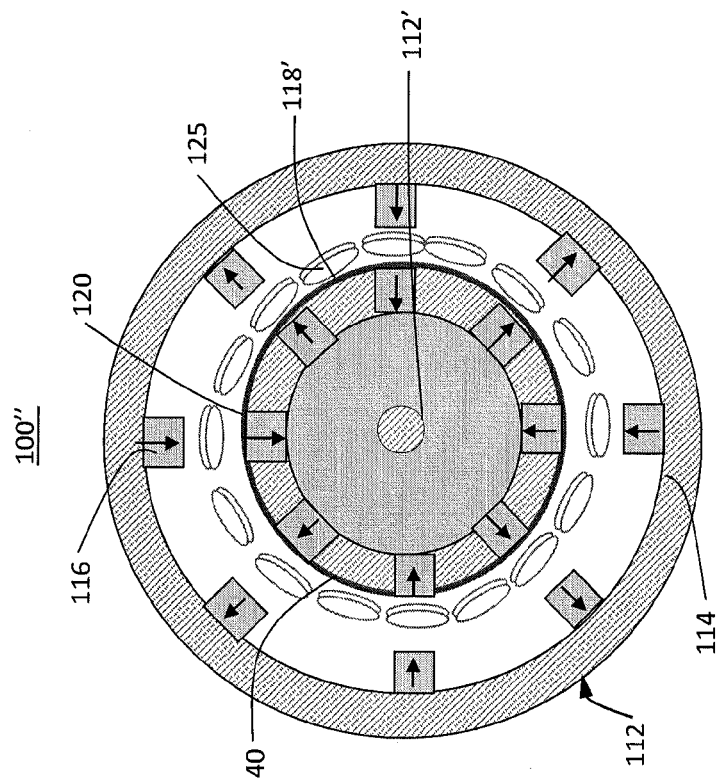
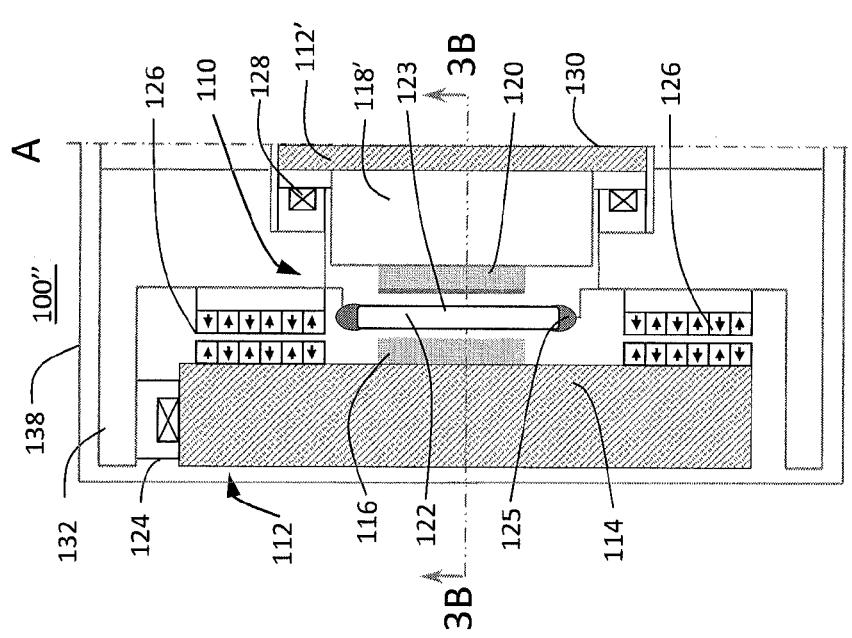
FIG. 3A
FIG. 3B

ELECTRIC MACHINE WITH INNER MAGNET HUB

BACKGROUND

This document relates to configurations of electric machines, such as those with motors, generators and those that are operated as both a motor and a generator (collectively motor/generators).

A motor/generator sized to accelerate a load is typically much larger than needed to maintain the load rotating at steady state speed. Consequently, the motor/generator is not optimal for steady state operation and experiences losses, often called iron losses, stemming from the losses in the core of the stator. One type of electric machine where these types of losses are particularly relevant is a flywheel power storage system. In a flywheel power storage system a flywheel is driven by a motor/generator to store electric power in the form of kinetic energy. When the power is needed, the flywheel's kinetic energy is discharged in driving the motor/generator to generate electric power. Such flywheel power storage systems are typically used in UPS systems to store power for use in a power failure and/or power regulation system to supply power when the primary source of power is irregular or of poor quality. As such, the flywheel power storage system's motor/generator spends most of its operating life at or near steady state speed in standby or waiting mode. These iron losses are an operating cost that impact the cost effectiveness of operating a flywheel power storage system, and particularly so in very large flywheel applications where standby time is significant. In other applications of motor/generators like pump motors and turbine generators, these losses are present and are part of the total machine operating loss, affecting the operating efficiency of the machine. For example, iron losses as low as 1% in a 1 megawatt (MW) system can amount to a 10 (kilowatt) kW loss, the primary standby operating loss in a flywheel. Some motor/generators can minimize these losses by using field coils to provide a field for the motor/generator during high loads that are then shut-off or minimized in standby mode to reduce losses. These systems, though, come with the trade-off of lower output efficiency during operation, potential failure points in the field coil and its power supply, delay in output power while the field is increased when the coil is turned on, higher rotor heating, and larger size. These trade-offs are less of an issue for permanent magnet motor/generators because they have a constant field that is highly reliable and do not need field coils or an associated power supply. However, unlike a powered field coil, permanent magnets cannot be turned off to reduce losses during standby mode.

SUMMARY

Certain aspects encompass an electric machine with a generally annular outer rotor supported to rotate about a rotational axis. The outer rotor defines an internal cavity therein and has a plurality of permanent magnets in the internal cavity generating a first magnetic field. An inner rotor is in the internal cavity and is supported to rotate about the rotational axis. The inner rotor has a plurality of permanent magnets about its perimeter that generate a second magnetic field. A generally annular stator is in the internal cavity between the outer rotor and the inner rotor. The stator has a stator winding supported by a non-magnetically conductive stator core. The stator winding is arranged to generate a field that interacts with the first and second magnetic fields. One or both of the outer rotor or the inner rotor is mechanically coupled to drive a load. The other of the outer rotor or the inner rotor can be configured to not be mechanically coupled to drive the load.

Certain aspects encompass a method. In the method, a first magnetic field is generated with a first set of permanent magnets supported to rotate about a rotational axis. A second magnetic field aligning with the first magnetic field is generated with a second set of permanent magnets supported to rotate about the rotational axis. A stator winding residing between the first and second set of permanent magnets is energized to generate a third magnetic field that revolves around the stator and that interacts with the first and second magnetic fields driving both an outer rotor and an inner rotor to rotate about the rotational axis.

Certain aspects encompass a system for driving a load. In the system a first permanent magnet is supported to rotate at a first diameter about a rotational axis. A second permanent magnet is supported to rotate about the rotational axis on a second diameter that is smaller than the first diameter. A stator winding is supported by a non-magnetically conductive stator core between the first and second permanent magnets and arranged to generate, when supplied with electrical power, a magnetic field that interacts with the magnetic fields of the first and second permanent magnets to drive the first and second permanent magnets to rotate about the rotational axis. One of the first or second permanent magnets is mechanically coupled to the load.

The details of one or more embodiments are set forth in the accompanying drawings and the description below. Other features, objects, and advantages will be apparent from the description and drawings, and from the claims.

DESCRIPTION OF DRAWINGS

FIG. 1A is a schematic half side cross-sectional view of an example machine in accordance with the concepts described herein.

FIG. 1B is a schematic end cross-sectional view of the example machine of FIG. 1A taken along 1B-1B.

FIG. 2A is a schematic half side cross-sectional view of an example machine with an integral flywheel in accordance with the concepts described herein.

FIG. 2B is a schematic end cross-sectional view of the example machine of FIG. 2A taken along 2B-2B.

FIG. 3A is a schematic half side cross-sectional view of an example machine with a load in the inner rotor in accordance with the concepts described herein.

FIG. 3B is a schematic end cross-sectional view of the example machine of FIG. 3A taken along 3B-3B.

Like reference symbols in the various drawings indicate like elements.

DETAILED DESCRIPTION

FIG. 1A shows an example electric machine 100 constructed in accordance with the concepts described herein. The example machine 100 includes a motor and/or generator (hereinafter motor/generator 110) arranged to drive and/or be driven by a load 112. The example machine 100 can be a number of different types of machines. In one example, the machine 100 is a generator, where the load 112 is a gas and/or liquid turbine through which a working fluid can be passed and/or expanded to drive the motor/generator 110 to generate electricity. In another example, the machine 100 is a pump or compressor, where the load 112 is an impeller (e.g., pump or compressor impeller) that is rotated by the motor/generator 110 to pump or compress fluids. The machine 100, in certain instances, can operate both as a generator and as a pump or"

compressor, where the load 112 is an impeller/turbine, through which a working fluid can be passed and/or expanded to drive the motor/generator 110 to generate electricity and that, when rotated by the motor/generator 110, can pump or compress fluids. In yet another example, the machine 100 is a flywheel power storage system, where the load 112 is a flywheel driven by the motor/generator 110 in storing electric power as kinetic energy. When the power is needed, the flywheel's kinetic energy is discharged in driving the motor/generator 110 to generate electric power. In other examples, the electric machine 100 can be other types of machines driving or being driven by other loads 112.

The illustrated machine 100 includes a generally annular outer rotor 114 mechanically coupled to drive and be driven by the load 112. The outer rotor 114 defines an internal cavity that has a plurality of radially inwardly oriented permanent magnets 116 alternating in polarity around the inner circumference of the cavity. As best seen in the example configuration shown in FIG. 1B, eight sets of magnets 116 are equally spaced around the internal cavity. These eight sets of magnets 116 define eight poles. The internal cavity receives an inner rotor 118 that also includes a plurality of permanent magnets 120. The permanent magnets 120 of the inner rotor are outwardly oriented and alternate in polarity about the perimeter of the inner rotor. In certain instances, the permanent magnets 120 of the inner rotor are retained to a hub of the inner rotor with a sleeve 140 that is preferably, although not necessarily, non-magnetically conductive (e.g., non-magnetic steel, a fiber and resin composite, such as carbon fiber, aramid fiber, and/or fiberglass, and/or another non-magnetically conductive material). The permanent magnets 116 of the outer rotor may also be retained to the outer rotor with a similar sleeve 140. As best seen in FIG. 1B, there are eight sets of magnets 120, corresponding in number, azimuthal and axial position, and polarity to magnets 116. The magnetic fields generated by the magnets 120 and 116 substantially align.

Both the outer rotor 114 and inner rotor 118 are supported to rotate about the rotational axis A-A. However, unlike the outer rotor 114, the inner rotor 118 is configured to rotate freely and is not mechanically coupled to drive the load 112. In other instances, the inner rotor can be mechanically coupled to drive the load 112 and the outer rotor 114 configured to rotate freely or both the inner and outer rotors mechanically coupled to drive the load 112.

The inner rotor 118, while shown as solid in FIG. 1A, can be annular as in FIG. 3A. Such an annular inner rotor 118 can internally accommodate a load 112' in addition to or in lieu of load 112 on the outer rotor 114. As with load 112, load 112' can be a turbine, for example to drive the inner rotor 118 in generating electrical power, and/or an impeller (e.g., pump, compressor and/or other impeller) driven by the inner rotor 118.

A generally annular stator 122 resides in the internal cavity between the outer rotor 114 and the inner rotor 118 (i.e., the inner rotor 118 is inside the annular stator 122). The stator 122 includes a stator winding 125 defining a corresponding number of poles to the outer rotor 114. In the example of FIG. 1A, the stator winding 125 is a plurality of conductors coiled around a core 123 to define eight poles. The stator winding 125 can also be arranged in a number of phases, for example, three phases, six phases, or another number of phases. In certain instances, the entire core or at least the core within the flux path, is constructed of a non-magnetically conductive material, and in certain instances non-electrically conductive material, (e.g., a non-ferrous material such as polymer, fiberglass and/or another non-magnetically conductive, non-electrically conductive material). Such a construction is referred to as being an "air core."

Collectively, the outer rotor 114, stator 122, and inner rotor 118 define the motor/generator 110. While the motor/generator 110 can take a number of different forms, in certain instances, the motor/generator is a synchronous, permanent magnet rotor, multiphase AC motor/generator.

As shown, the load 112 can be integral with and/or a component of the outer rotor 114. In other instances, the load 112 is directly affixed to the outer rotor 114, or to an intermediate shaft, for example, by fasteners, welding, or in another manner. If directly affixed, the load 112 and outer rotor 114 can be coupled without a gear train and rotate at the same speed. An example machine 100 with the load 112 integral with or arranged to rotate at the same speed as the outer rotor 114 is what is referred to as a "direct drive" machine. In other instances, the load 112 can be coupled to the outer rotor 114 via a gear train that causes the load 112 to rotate at a different speed (faster or slower) than the outer rotor 114. Rotation of the rotor 114, whether integral or otherwise mechanically coupled, drives the load and vice versa.

Bearings 124, 126 are arranged on a frame 132 to support the outer rotor 114 and load 112 to rotate around the stator 122 and axis A-A. One or more of the bearings 124, 126 can include ball bearings, needle bearings, non-contact magnetic bearings (active and/or passive), foil bearings, journal bearings, and/or others. Both bearings 124, 126 need not be the same types of bearings. The bearing 124, in the present example, is arranged at the end of the outer rotor 114 oriented to act axially on the outer rotor 114 and operate as a thrust bearing that axially supports the outer rotor 114. In certain instances, a second bearing 124 can be arranged at the opposite end of the outer rotor 114. The bearings 126 are arranged in the internal cavity to act radially on the outer rotor 114 and operate as radial bearings that radially support the outer rotor 114. Two bearings 126 are shown, axially spaced from one another, but fewer or more could be used. For example, one or both of bearings 126 could be combination radial and axial bearings and bearing 124 omitted.

In the present example, bearing 124 is an axial magnetic actuator that can act on the outer rotor 114 radially without contacting the outer rotor 114 and is part of a magnetic bearing system. The axial force provided by bearing 124 can be actively controlled by a control algorithm in a bearing controller. Bearings 126, in the present example, are passive magnetic bearings, for example, an arrangement of permanent magnets of like polarity arranged to repel or attract one another but without any active force control capability. Other configurations of bearings 124, 126 could be utilized. In the embodiments where the bearings 124, 126 are magnetic bearings, the example machine 100 may include one or more backup bearings and/or bushings, for example, for use at start-up and shut-down or in the event of a power outage that affects the operation of the magnetic bearings 124, 126.

Bearings 128, 130 are arranged on a frame 132 to support the inner rotor 118 to rotate in the stator 122. As above, one or more of the bearings 128, 130 can include ball bearings, needle bearings, non-contact magnetic bearings (active and/or passive), foil bearings, journal bearings, and/or others. Both bearings 128, 130 need not be the same types of bearings. In the illustrated example, the bearings 128, 130 are arranged as combination thrust and radial bearings to both axially and radially support inner rotor 118. Two bearings 128, 130 are shown, axially spaced from one another, but fewer or more could be used.

The motor/generator 110 and the load 112 can be contained in an enclosure 138. In certain instances, for example a flywheel system, the enclosure 138 can be hermetically sealed and coupled to a vacuum pump to maintain the interior of the enclosure 138 at a pressure below atmospheric to reduce losses from aerodynamic drag from the rotating components. For example, the interior of the enclosure 138 can be maintained at a vacuum pressure of less than one to fifty milli-Torr using commonly available vacuum pumps. In other examples, this pressure could be maintained at one to ten Torr to allow use of a lower cost vacuum pump, or at pressures below one milli-Torr to further minimize any rotor heating due to rotor drag with use of advanced vacuum pumps. In another example, the enclosure can be pressurized with a low density gas, such as helium, to achieve low aerodynamic drag.

In operating the motor/generator 110 to motor, electric power is supplied through the coils of the stator winding 125 to generate one or more magnetic fields that revolve around the stator 122. The magnetic fields in the windings 125 interact with the permanent magnets 116 of the outer rotor 114 and permanent magnets 120 of the inner rotor 118 to define a corresponding number of magnetic flux circuits, each including a pair of adjacent permanent magnets 116 of the outer rotor 114, their counterpart pair of permanent magnets 120 on the inner rotor 118, and the proximate windings 125 of the stator 122. Thus, as a field revolves around the stator 122 it drives both the outer rotor 114 and inner rotor 118 to rotate about the axis A-A. The fields of the outer rotor 114 and inner rotor 118 are substantially in alignment and remain so as the inner rotor 118 rotates with the outer rotor 114. Furthermore, the arrangement experiences little or no iron losses, because the "iron," outer rotor 114 and inner rotor 118, magnetic field paths rotate with the permanent magnets and thus see little or no variation in magnetic field and thus generate little or no hysteresis or eddy current losses.

Operating the motor/generator 100 to generate electric power is similar to motoring. Rotating the outer rotor 114 moves magnetic fields around the windings of the stator 122 and induces a voltage in the windings 125. As above, the inner rotor 118 rotates with the outer rotor 114 and its permanent magnets 120 participate with the permanent magnets 116 of the outer rotor 114 and windings of the stator 122 to define magnetic flux circuits.

Referring briefly to FIGS. 2A and 2B, a configuration of electric machine 100' is shown with a flywheel integral with the outer rotor 114'. The flywheel/outer rotor 114' is made of an annular flywheel ring 134 (e.g., steel, ceramic and/or other material) and a fiber and polymer composite sleeve 136 (e.g., carbon fiber, aramid fiber, structural fiberglass) wound or otherwise applied around the metallic ring. In instances where the annular flywheel ring 134 is non-magnetically conductive, a magnetically conductive inner portion can be provided proximate the permanent magnets 116 to conduct the magnetic field for the motor/generator. The ring 134, in an example flywheel, primarily provides the mass of the flywheel and the sleeve 136 is configured to compressively strain the ring 134 such that the net maximum stress in the ring 134 is reduced at operating speed. In certain instances, the sleeve 136 is arranged to compressively strain the ring 134 throughout the entire operating range of the electric machine. In other instances, the sleeve 136 can compressively strain the ring 134 throughout a portion of the operating range and allow the ring to go into tension at the higher speeds of the operating range. The sleeve 136 can prevent the ring 134 from exceeding a specified maximum stress (e.g., over stress) during operation of the machine 100' and reduce and/or zero the mean stress, improving fatigue, to enable use of lower strength (and typically less expensive to construct) ring 134 material. In one example, the ring 134 is rolled and welded steel rather than a forged steel ring. Such a construction with ring 134 with sleeve 136 is particularly useful in large flywheel applications, where the cost of a large, high strength flywheel is significant. Also, because the flywheel is annular, it is easier to construct than a solid flywheel and, compared to a solid flywheel of the same outer diameter and length, weighs 70% less yet is still able to store more than 50% of the useable energy.

A number of embodiments have been described. Nevertheless, it will be understood that various modifications may be made. Accordingly, other embodiments are within the scope of the following claims.

What is claimed is:

1. An electric machine, comprising:
a generally annular outer rotor supported to rotate about a rotational axis, the outer rotor defining an internal cavity therein and comprising a plurality of permanent magnets in the internal cavity generating a first magnetic field;
an inner rotor in the internal cavity and supported to rotate about the rotational axis, the inner rotor comprising a plurality of permanent magnets about the perimeter of the inner rotor and generating a second magnetic field;
a generally annular stator in the internal cavity between the outer rotor and the inner rotor, the stator comprising a stator winding supported by a non-magnetically conductive stator core and arranged to generate a third magnetic field that interacts with the first and second magnetic fields and drives the outer rotor and inner rotor to rotate; and
a load, one of the outer rotor or the inner rotor mechanically coupled to drive the load and the other of the outer rotor or the inner rotor not mechanically coupled to drive the load.

2. The machine of claim 1, where the load comprises a flywheel and where the outer rotor is mechanically coupled to drive the flywheel.

3. The machine of claim 2, where the flywheel is integral with the outer rotor.

4. The machine of claim 1, where the outer rotor comprises an annular metallic ring and a fiber and polymer composite sleeve around the metallic ring, the sleeve compressively straining the metallic ring.

5. The machine of claim 4, where the sleeve is arranged to compressively strain the metallic ring throughout the entire operating range of the electric machine.

6. The machine of claim 4, where the sleeve is adapted to prevent the metallic ring from over stressing when the electric machine is operating in the operating range of the electric machine.

7. The machine of claim 4, where the metallic ring comprises a piece of metal that has been rolled and welded to form a ring.

8. The machine of claim 4, where the fiber and resin composite comprises at least one of carbon fiber, aramid fiber, or fiberglass.

9. The machine of claim 4, where the metallic ring comprises a non-magnetically conductive material and a magnetically conductive material, the magnetically conductive material adjacent the permanent magnets of the outer rotor.

10. The machine of claim 1, where the load comprises an impeller or turbine.

11. The machine of claim 1, further comprising a plurality of magnetic bearings supporting the outer rotor to rotate about a rotational axis.

12. The machine of claim 11, where the magnetic bearings comprise an active axial magnetic bearing and a passive radial bearing.

13. The machine of claim 1, where the stator, outer rotor and inner rotor are arranged such that, when operating as a motor and electric power is supplied through the stator winding to generate one or more magnetic fields that revolve around the stator, that the magnetic fields interact with the permanent magnets of the outer rotor and the inner rotor and drive both the outer rotor and inner rotor to rotate about the rotational axis.

14. The machine of claim 1, further comprising a sealed enclosure containing the outer rotor, the inner rotor, the stator and the load, and the interior of the enclosure being at a vacuum.

15. The machine of claim 1, further comprising a second load and where the one of the outer rotor or the inner rotor that is not mechanically coupled to drive the load is mechanically coupled to drive the second load.

16. A method, comprising:
   with an electric machine comprising:
      a generally annular outer rotor supported to rotate about a rotational axis, the outer rotor defining an internal cavity therein and comprising a first set of permanent magnets in the internal cavity generating a first magnetic field;
      an inner rotor in the internal cavity and supported to rotate about the rotational axis, the inner rotor comprising a second set of permanent magnets about the perimeter of the inner rotor and generating a second magnetic field;
      a generally annular stator in the internal cavity between the outer rotor and the inner rotor, the stator comprising a stator winding supported by a stator core and arranged to generate a third magnetic field that interacts with the first and second magnetic fields and drives the outer and inner rotor to rotate; and
      a load, one of the outer rotor or the inner rotor mechanically coupled to drive the load and the other of the outer rotor or the inner rotor not mechanically coupled to drive the load; and
   energizing the stator winding residing between the first and second set of permanent magnets to generate the third magnetic field that revolves around the stator and that interacts with the first and second magnetic fields driving both the outer rotor and an inner rotor to rotate in the same direction about the rotational axis.

17. The method of claim 16, further driving the load, where the load comprises a flywheel, with the second set of permanent magnets to store electric power as kinetic energy.

18. The method of claim 16, compressively straining a metallic ring of the outer rotor with a fiber and resin composite sleeve around the metallic ring.

19. The method of claim 17, further comprising discharging the kinetic energy by rotating the first and second set of permanent magnets about the rotational axis and inducing a voltage in the stator winding.

20. The method of claim 16, supporting the second set of permanent magnets with a magnetic bearing.

21. The method of claim 16, where the stator winding is supported on a non-magnetically conductive core.

22. The method of claim 21, where the core is non-electrically conductive.

23. A system for driving a load, comprising:
   a first set of permanent magnet poles supported to rotate at a first diameter about a rotational axis;
   a second set of permanent magnet poles supported to rotate about the rotational axis on a second diameter that is smaller than the first diameter; and
   a stator winding supported by a non-magnetically conductive stator core between the first and second permanent magnet poles and arranged to generate, when supplied with electrical power, a magnetic field that interacts with the magnetic fields of the first and second permanent magnet poles to drive the first and second permanent magnet poles to rotate in the same direction about the rotational axis and where one of the first or second permanent magnet poles is mechanically coupled to the load, one of the first set of permanent magnet poles or the second set of permanent magnet poles mechanically coupled to drive the load and the other of the first set of permanent magnet poles or the second set of permanent magnet poles not mechanically coupled to drive the load.

24. The system of claim 23, where the load is a flywheel and the first permanent magnet poles are coupled to the flywheel to rotate with the flywheel and the second permanent magnet poles are configured to rotate free of the load.

25. The system of claim 24, where the flywheel comprises a metallic ring reinforced with a composite sleeve around its exterior.

* * * * *